United States Patent [19]
Horikami

[11] Patent Number: 5,263,098
[45] Date of Patent: Nov. 16, 1993

[54] OBJECT RECOGNITION METHOD AND APPARATUS FOR DETERMINING THE PRESENCE AND SHAPE OF AN OBJECT

[75] Inventor: Kinji Horikami, Suita, Japan

[73] Assignee: Matsushita Electric Industrial Co., Ltd., Osaka, Japan

[21] Appl. No.: 726,685

[22] Filed: Jul. 8, 1991

[30] Foreign Application Priority Data

Jul. 6, 1990 [JP] Japan .................. 2-180057

[51] Int. Cl.⁵ .............................................. G06K 9/00
[52] U.S. Cl. ......................................... 382/48; 382/18; 382/27; 382/33
[58] Field of Search ................ 382/48, 27, 33, 18, 382/25, 10

[56] References Cited

U.S. PATENT DOCUMENTS 4,809,344  2/1989  Peppers et al. ............... 382/33
4,941,192  7/1990  Mishima et al. ............... 382/27

FOREIGN PATENT DOCUMENTS 59-35064  8/1984  Japan .

Primary Examiner—Michael T. Razavi
Assistant Examiner—Yon J. Couso
Attorney, Agent, or Firm—Wenderoth, Lind & Ponack

[57] ABSTRACT

An object recognition apparatus for determining the presence and shape of an object in an image has a multiplier, an adder and a memory for obtaining histograms relative to densities for each of specified partial areas in the image. The histogram of each partial area is stored in the memory at addressed determined by adding an actual density of each of pixels in the partial area to a number indicating the partial area multiplied to be shifted to the left by the number of quantization bits. In a micro computer of the apparatus, the histogram for each partial area compared with a corresponding reference histogram which indicates that an object is present in an at least one part of the partial area. Based on a comparison result, the micro computer determines whether the object is present or not in each partial area. Then, based on the combination of partial areas where it is determined that the object is present, the shape of the object is evaluated.

10 Claims, 10 Drawing Sheets

OBJECT RECOGNITION METHOD AND APPARATUS FOR DETERMINING THE PRESENCE AND SHAPE OF AN OBJECT

BACKGROUND OF THE INVENTION

1. Field of the Invention

The present invention relates to an object recognition method and apparatus for determining the presence and shape of an object by means of image processing of a video signal obtained with an imaging apparatus such as a television camera.

2. Description of Prior Art

Determining the presence and shape of an object by means of image processing has become an important factor in the automation of production processes in recent years.

Figure 1:
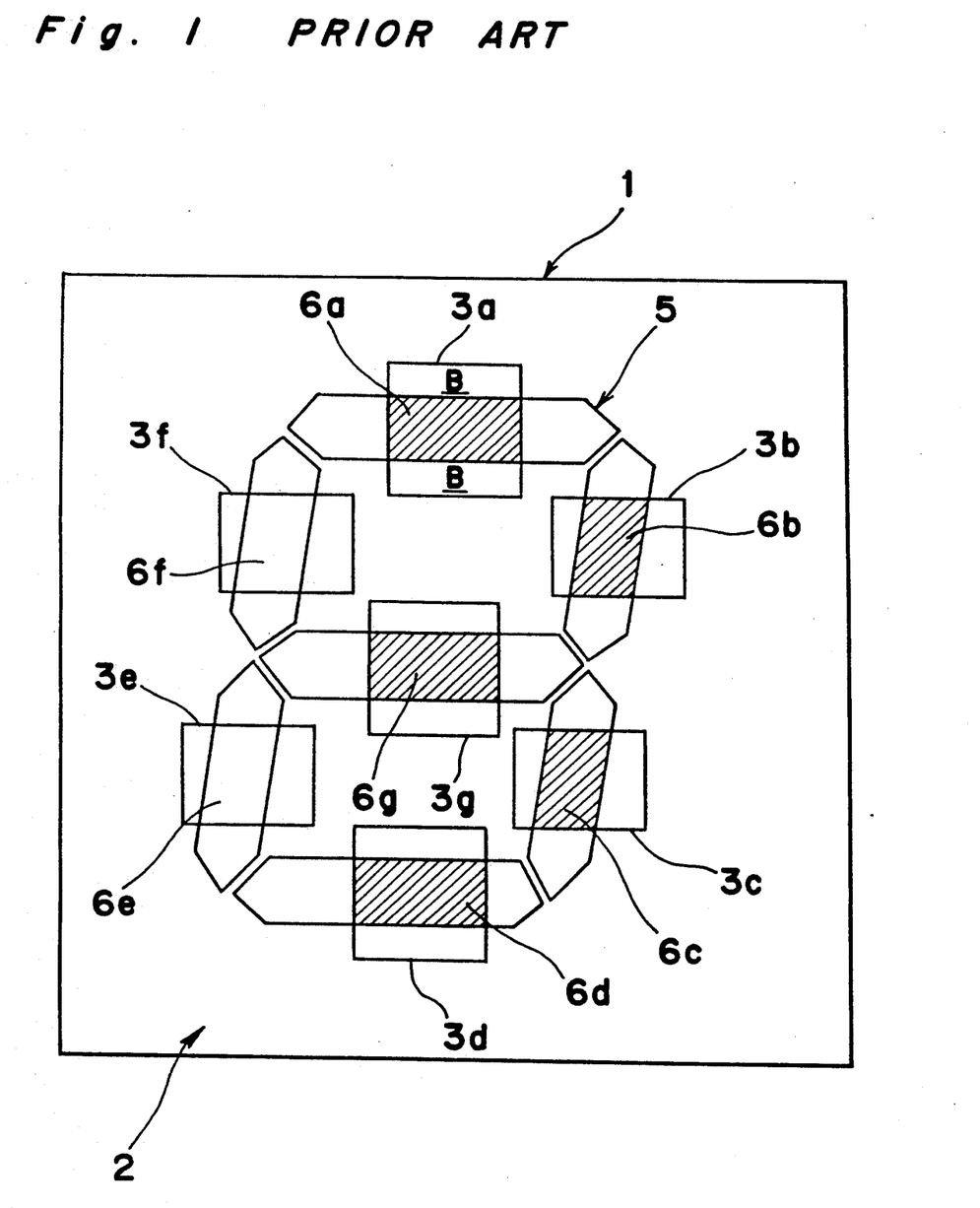
FIG. 1 is a diagram for explaining a prior art object recognition method.

One conventional recognition method as disclosed in the Japanese Patent Publication No. 52-41016 (issued in 1977) is described below with reference to FIG. 1. FIG. 1 shows a recognition object image 1 being processed with a mask plane or mask image 2 having a plurality of partial areas 3a-3g at specific portions. The recognition object image 1 is an image obtained by imaging a seven-segment display apparatus. In this case, light emitting segments of the display apparatus are treated as a recognition object 5 contained in the recognition object image 1.

Areas where the partial areas 3a-3g overlap the recognition object 5 are regarded as presence areas 6a-6g.

According to the conventional method, the first step in the recognition process is to separate the presence area 6a from the background B within the partial area 3a by some known technique. Then, the area of the presence area 6a in the partial area 3a is obtained. A variety of methods are used to separate the presence area 6a from the background, but the most common is a binary digitization process whereby a value of 1 is assigned to densities greater than some predetermined threshold value, and a value of 0 is assigned to any densities lower than that threshold value.

If the presence area 3a so separated has a brightness which is larger than a predetermined value, it is determined that at least one part of the object 5 is present. Specifically, it is determined that the highest of the seven segments is illuminated. This same presence evaluation is thereafter repeated for the presence areas 6b-6g in the other partial areas 3b-3g. If the presence of the object 5 is confirmed in the partial areas 3a-3d and 3g as a result of the above object presence determination operation, then a prepared truth table can be referenced to recognize that the 7-segment display is showing the number "3".

As described above, this method requires that a predetermined threshold value be set to separate each presence area 6a-6g from the background. However, it is difficult to determine such a threshold value that can reliably separate the presence area of the object from the background unless the contrast of the image 1 is good. An image on a liquid crystal display can be cited as an example of an image which does not have good contrast. In addition to the above disadvantage, an additional means for setting a threshold value must also be provided.

SUMMARY OF THE INVENTION

Therefore, a primary object of the present invention is to provide an object recognition apparatus which can easily and reliably determine whether or not an object to be recognized is present in specific areas of an image, and then value the shape of the object, irrespective of the degree of contrast of the image.

Another object of the present invention is to provide an object recognition method which can easily and reliably determine whether or not an object to be recognized is present in specific areas of an image, irrespective of the degree of contrast of the image.

In order to accomplish the first object, the present invention provides an object recognition apparatus which processes pixels positioned in a plurality of predetermined partial areas of an image containing an object to be recognized for determining whether the object is present or absent in each of the partial areas, and which comprises (a) first means for obtaining a certain data representing whole pixels for each partial area while the image is being scanned, (b) second means for comparing data obtained by the first means for each partial area with reference data, and (c) third means for determining whether the object is present or absent in each partial area based on a comparison result obtained by the second means.

The object recognition apparatus of an embodiment further comprises means for evaluating the shape of the object from the combination of partial areas wherein it is determined by the third means that the object is present.

Furthermore, in order to accomplish the second object, the present invention provides an object recognition method for processing pixels positioned in a plurality of predetermined partial areas of an image containing an object to be recognized for determining whether the object is present or absent in each of the partial areas, comprising steps of (a) obtaining a certain data representing whole pixels for each partial area while the image is being scanned, (b) comparing the certain data for each partial area with reference data, and (c) determining whether the object is present or absent in each partial area based on the comparison result.

The method may comprise a further step of evaluating the shape of the object from the combination of partial areas where it is determined that the object is present.

The object recognition apparatus and the object recognition method of the present invention make use of the fact that measured data of the whole pixels in each partial area when an object to be recognized is present is different from that when the object is not present. In the object recognition apparatus and method of the present invention, data such as histograms, normalized histograms, densities, or frequency components can be measured simultaneously with image scanning, and it is not necessary to separate the object from the background and therefore it is not necessary to set a threshold value for separating the object from the background. As a result, the determination of the presence and shape of the object can be done easily, quickly and accurately, irrespective of the contrast degree of the image.

In addition, according to the object recognition apparatus and method of the present invention, even when an image on a crystal liquid display, for example, which does not have a good contrast, is processed, it is possible to easily determine whether an object is present or not and further to evaluate the shape of the object, by using an appropriate reference value.

When frequency components are used for the object presence determination, features of the object such as a surface condition, texture, etc. can be distinguished.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

First Embodiment

An object recognition apparatus of a first embodiment of the present invention is described hereinbelow with reference to FIGS. 2-4.

Figure 2:
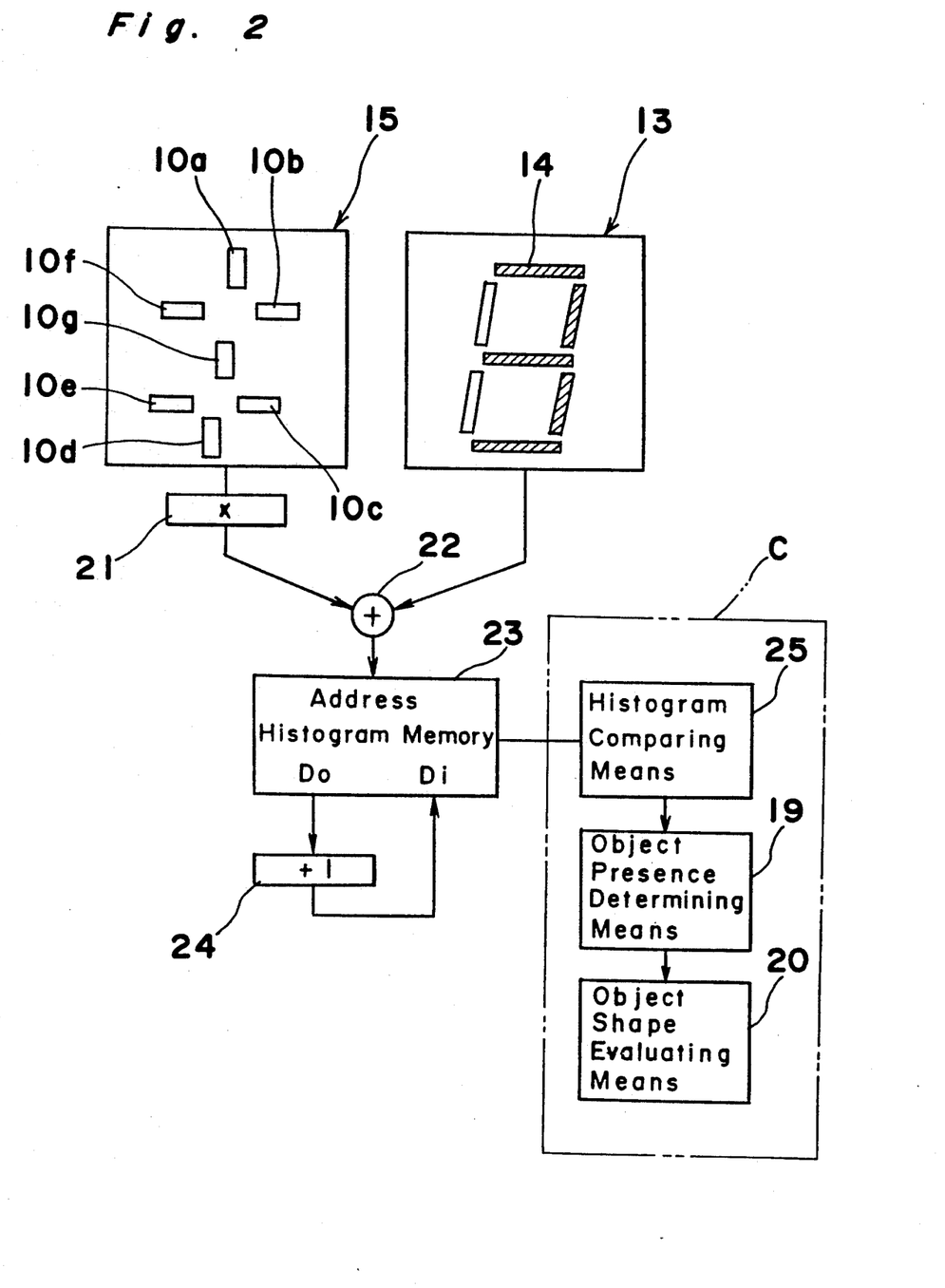
FIG. 2 is a block diagram of an object recognition apparatus according to a first embodiment of the present invention.

In FIG. 2, a reference number 13 indicates a recognition object image obtained by imaging a 7-segment display apparatus, a reference number 14 indicates an object contained in the recognition object image 13, i.e. an image of the 7-segment display apparatus, and a reference number 15 indicates a mask image or mask plane 15 which stores data indicative of positions of first through seventh partial areas 10a-10g. The recognition image 13 and the mask image 15 are the same size.

Figure 3:
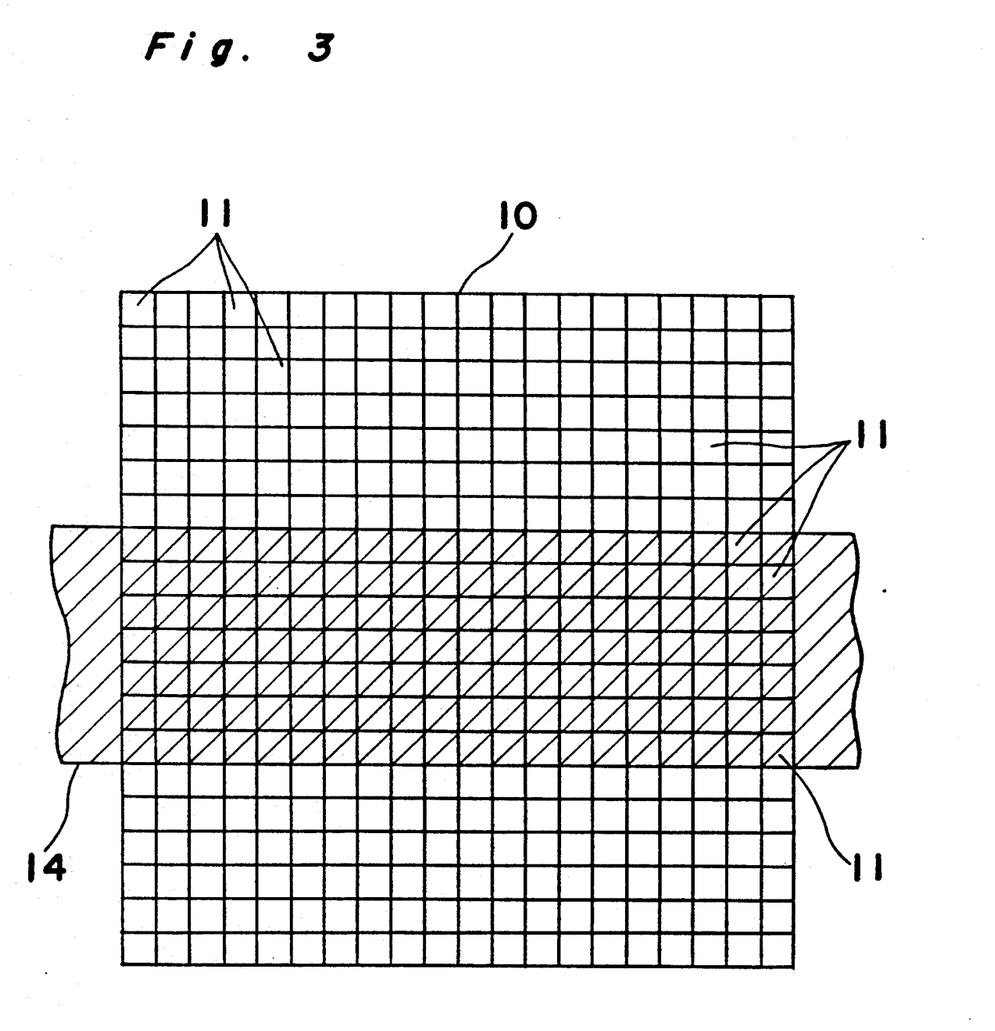
FIG. 3 is an illustration showing pixels of a recognition object image in an partial area.
Figure 4:
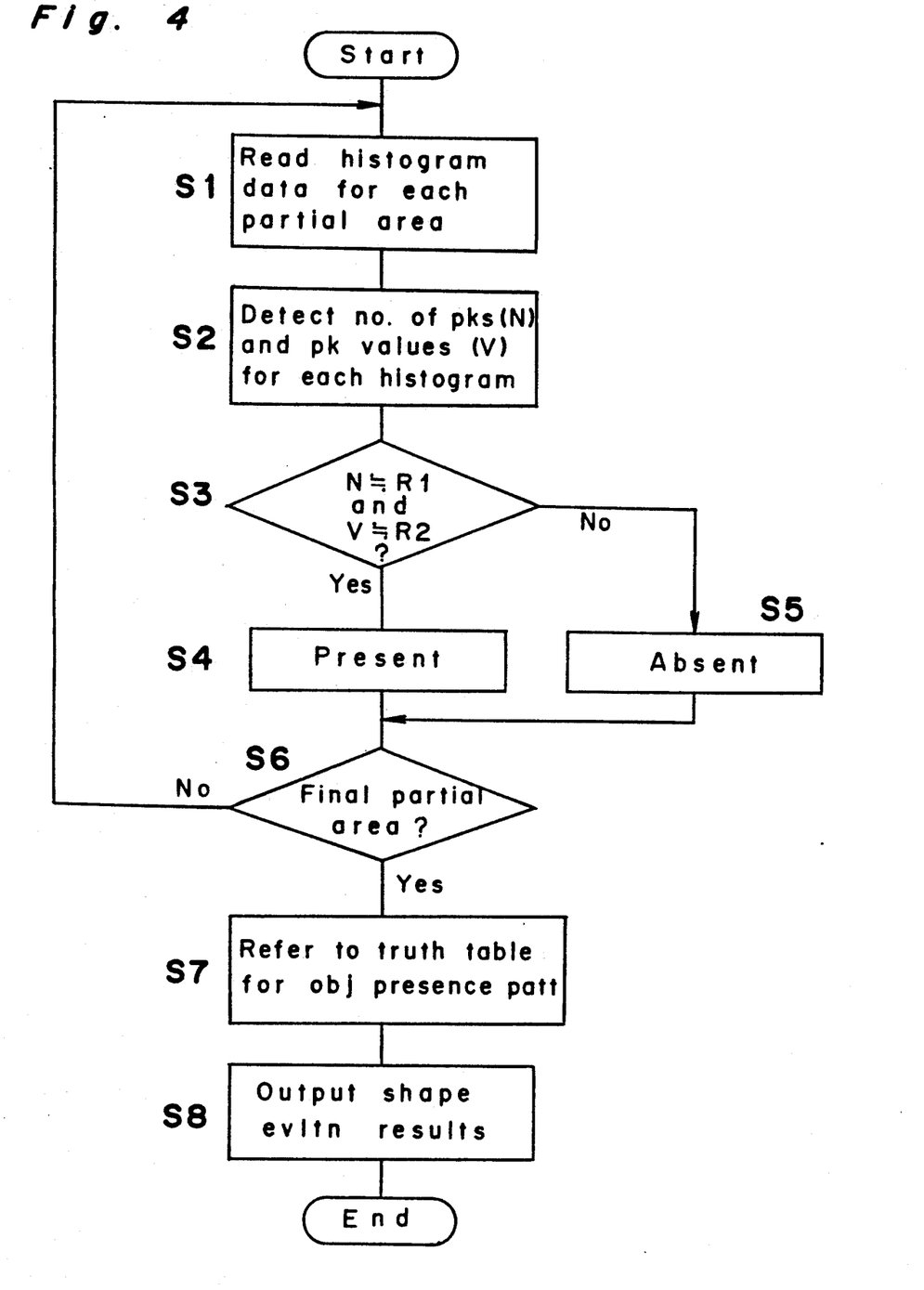
FIG. 4 is a flowchart showing steps taken in the micro computer of the object recognition apparatus of FIG. 2.

The recognition object image 13 in each partial area is decomposed into a plurality of pixels 11 through sampling and quantization processes as shown in FIG. 3 wherein the partial areas 10a-10g are represented by a partial area 10. The pixels 11 express density values, i.e., gray levels of the recognition object image 13.

The recognition apparatus has a multiplier 21 to shift the partial area number in the mask image 15 to the left by the number of quantization bits in the recognition object image 13, an adder 22 to add the partial area number multiplied by the multiplier 21 to the density data for each pixel of the recognition object image 13 in each partial area, a histogram memory 23 to store data obtained by counting the number of times the same address appears when the output from the adder 22 is used as an address, and an incrementing adder 24 which adds "1" to data at an address specified for incrementing and then stores the incremented data to the same address when data representing the same address are outputted from the adder 24.

The recognition apparatus also has a histogram comparing means 25 which compares contents of the histogram memory 23 with a reference value (data) for each of the first to seventh partial areas 10a-10g, an object presence determining means 19 which determines whether or not the object 14 is present in the partial areas 10a-10g, and an object shape evaluating means 20 which determines the shape of the object. These means 25, 19 and 20 are constituted from software stored in a micro computer C.

A recognition apparatus thus constructed operates as described hereinbelow.

To simplify the description, it is assumed that the recognition object image 13 is expressed by 6-bit 64-scale density data. The following process is repeated sequentially for each pixel across the entire area of the recognition object image 13 when the recognition object image 13 and the mask image 15 are stacked together.

When a pixel 11 being processed is in the first partial area 10a, the partial area number "1" is shifted left six bits in binary expression, i.e., is multiplied times 64, by the multiplier 21, and actual density data of the pixel 11 is added to the shifted partial area number "1000000" by the adder 22. Data thus obtained by adding the shifted partial area number and the actual density data of the pixel is assigned as an address in the histogram memory 23. Thus, the histogram memory 23 outputs contents of the supplied address through a data-out terminal Do. The output data is incremented by one by the incrementing adder 24, and this addition result is stored again to the same address in the histogram memory 23 through a data-in terminal Di.

By repeating this same process across the entire area, the contents of the histogram memory 23 are sequentially rewritten with the histogram data for each of the partial areas 10a-10g. Because the density data has 64 levels, the histogram data for each of the partial areas 10a-10g are stored in an interval of 64 memory areas of the histogram memory 23 from the low to the high address in partial area number sequence. The histogram data for each partial area is processed as follows and as shown in FIG. 4.

First, at step S1, the histogram of the partial area 10a is read out from the histogram memory 23 to be then supplied to the micro computer C. Then at step S2, the number N of histogram peaks and the peak values V for the partial areas 10a are detected. These detected values N and V are respectively compared with respective reference values R1 and R2 which represent the presence of the object in the partial areas 10a-10g. These steps S2-S3 constitute the histogram comparing means 25.

If $N \approx R1$ and $V \approx R2$, it is determined at step S4 that the object 14 is present in the partial area 10a. On the other hand, if N is not in the vicinity of R1 or V is not in the vicinity of R2, it is determined at step S5 that the object 14 is absent in the partial area 10a. These steps S4 and S5 correspond to the object presence determining means 19.

At step S6, it is discriminated whether or not the partial area 10a is a final partial area processed. When the partial area 10a is not a final partial area, the above process from step 1 to step 6 is repeated till data processing of the final partial area 10g is completed.

Next, at step S7, the shape of the object 14 is evaluated with reference to a truth table expressing object presence patterns. In this case shown in FIG. 2, it is determined that a "3" is displayed in the 7-segment display from the fact that the object 14 is present in the first through the fourth and the seventh partial areas 10a, 10b, 10c, 10d, and 10g. Finally, the shape of the object 14 is output at step S8. These steps S7 and S8 constitute the object shape evaluating means 20.

As thus described, because a histogram is obtained for each of the partial areas 10a–10g by image scanning in this first embodiment, it is not necessary to separate the object 14 from the background, and in addition, histogram results can be obtained at high speed and the presence of the subject 14 can be determined accurately.

Second Embodiment

A recognition apparatus according to a second embodiment of the present invention is described hereinbelow with reference to FIG. 5. This embodiment is different in function of the micro computer C from the first embodiment. Therefore, parts common to the first and second embodiments are omitted from FIG. 5 and a description of those parts is also omitted here. In this embodiment, also, the mask image 15 having a plurality of partial areas is used although it is not shown in FIG. 5.

The micro computer C of this embodiment has a normalizing means 30, a subtractor 31, a differential histogram accumulating means 32 and a comparing means 33 as described later, in addition to the object presence determining means 19 and the object shape evaluating means 20.

Figure 5:
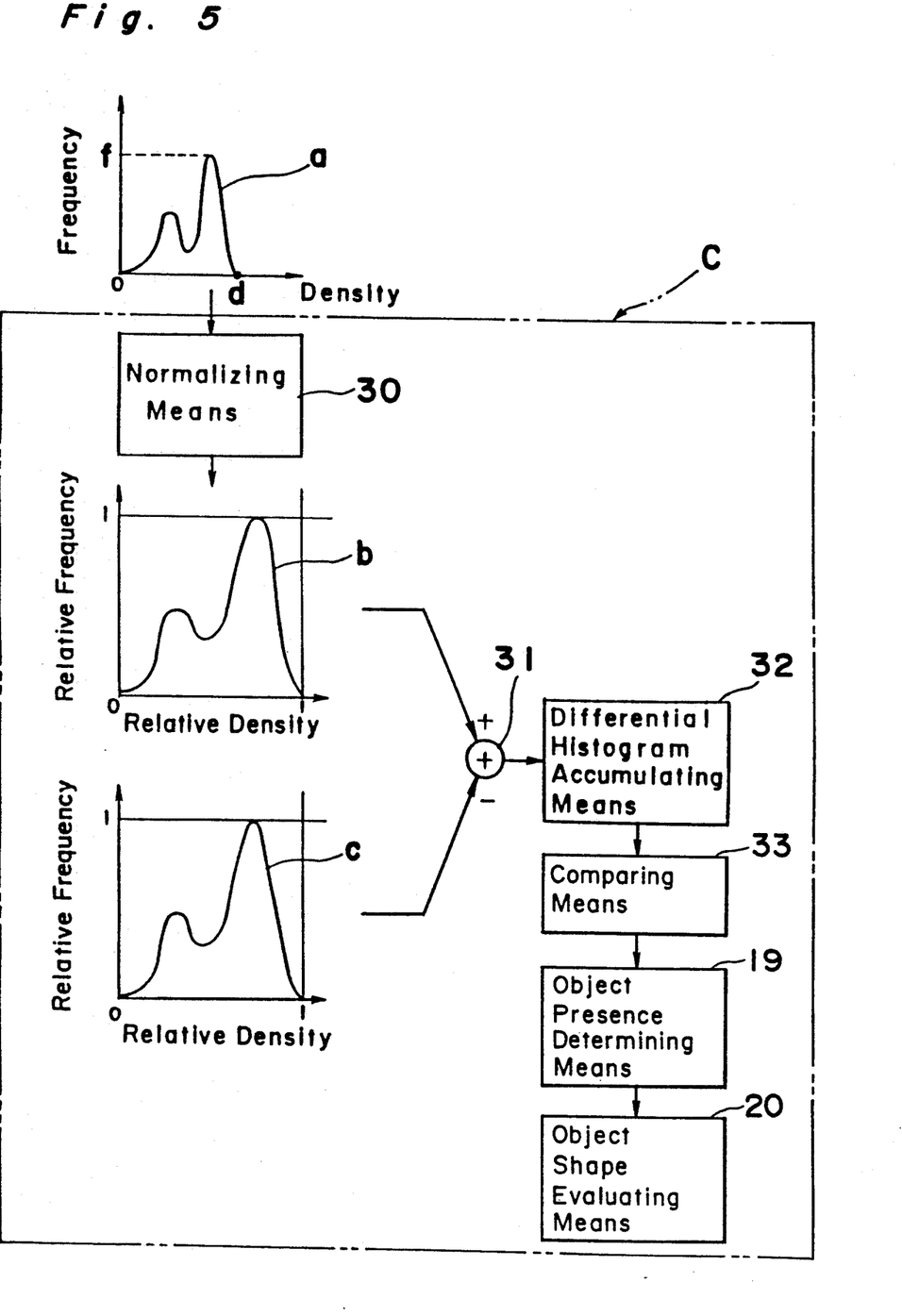
FIG. 5 is a block diagram of an object recognition apparatus according to a second embodiment of the present invention.

In FIG. 5, "a" is an actual histogram of, for example, the first partial area 10a (see FIG. 2) stored in the histogram memory 23 (see FIG. 2), wherein a point "f" indicates a maximum frequency and a point "d" indicates a maximum density in the histogram "a". A histogram "b" is a histogram obtained by normalizing the histogram "a" in frequency and density by the normalizing means 30, and a histogram "c" is a normalized reference histogram preliminarily prepared for the use of determination of the object presence/absence in the partial areas.

The subtractor 31 calculates a difference between the reference and normalized histograms "c" and "b" at each relative density, the differential histogram accumulating means 32 accumulates the differences between the reference and normalized histograms "c" and "b" for the relative densities from 0 to 1, and the comparing means 33 compares the differences accumulated with a reference value.

Figure 6:
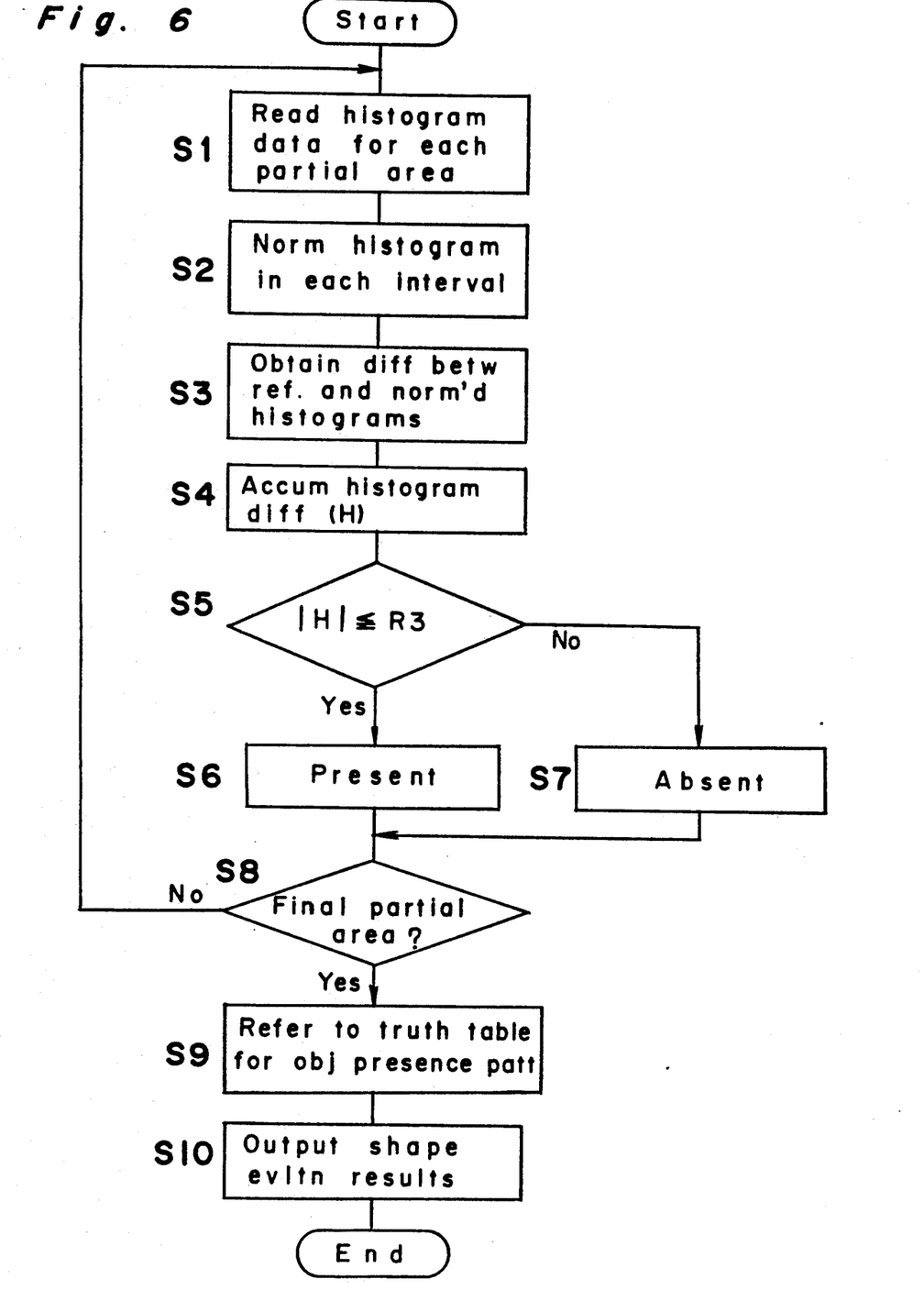
FIG. 6 is a flowchart showing steps taken in the micro computer of the object recognition apparatus of FIG. 5.

The recognition apparatus thus constituted operates as described hereinbelow and as shown in FIG. 6.

First, at step S1, the histogram "a" of the partial area 10a, which is stored in the histogram memory 23 (see FIG. 2), is read out. Then, at step S2, the histogram "a" is normalized so that the maximum frequency "f" becomes a relative frequency of 1 and that the maximum density d becomes a relative density of 1. This process provides the normalized histogram "b". This step S2 constitutes the normalizing means 30.

Next, at step S3, a difference between the relative frequencies of the normalized histogram "b" and the reference histogram "c" is then calculated for each relative density. The differences for all relative densities 0 from 1 are accumulated at step S4. This step S4 corresponds to the differential histogram accumulating means 32.

Next, at step S5, an absolute value $|H|$ of the sum of the histogram differences from 0 to 1 is compared with a reference value R3. The reference value R3 indicates an upper limit of a relative difference between the normalized and reference histograms "b" and "c", because the more the normalized histogram "b" resembles the reference histogram "c", the smaller the absolute value $|H|$ is. The step S5 corresponds to the comparing means 33 of FIG. 5.

When the comparison result indicates that $|H| \leq R3$, it is determined at step S6 that the object 14 is present in the partial area 10a. However, if $|H| > R3$, it is determined at step S7 that the object 14 is not present in the partial area 10a. These steps S6 and S7 correspond to the object presence determining means 19.

At step S8, it is discriminated whether or not the partial area 10a is a final partial area processed. When the partial area 10a is not a final partial area, the above processing from step 1 to step 8 is repeated till data process of the final partial area 10g is completed.

Next, at step S9, the shape of the object 14 is evaluated with reference to a truth table expressing object presence patterns. In the case shown in FIG. 2, it is determined that a "3" is displayed in the 7-segment display from the fact that the object 14 is present in the first through the fourth and the seventh partial areas 10a, 10b, 10c, 10d, and 10g. Finally, the shape of the object 14 is output at step S10. These steps S9 and S10 constitute the object shape evaluating means 20.

As thus described, because the object presence/absence can be determined by comparing a normalized histogram with a reference histogram for each of the partial areas, changes in the brightness of the background and in the brightness of the object itself can be compensated to obtain a correct evaluation result. It is to be noted that the invention shall not be limited to the histogram normalization technique described hereinabove.

Third Embodiment

An object recognition apparatus according to a third embodiment of the present invention is described below with reference to FIG. 7 and 8. This embodiment also uses a mask image having a plurality of partial areas like the mask 15 shown in FIG. 2 although no mask image is shown in FIG. 7.

Figure 7:
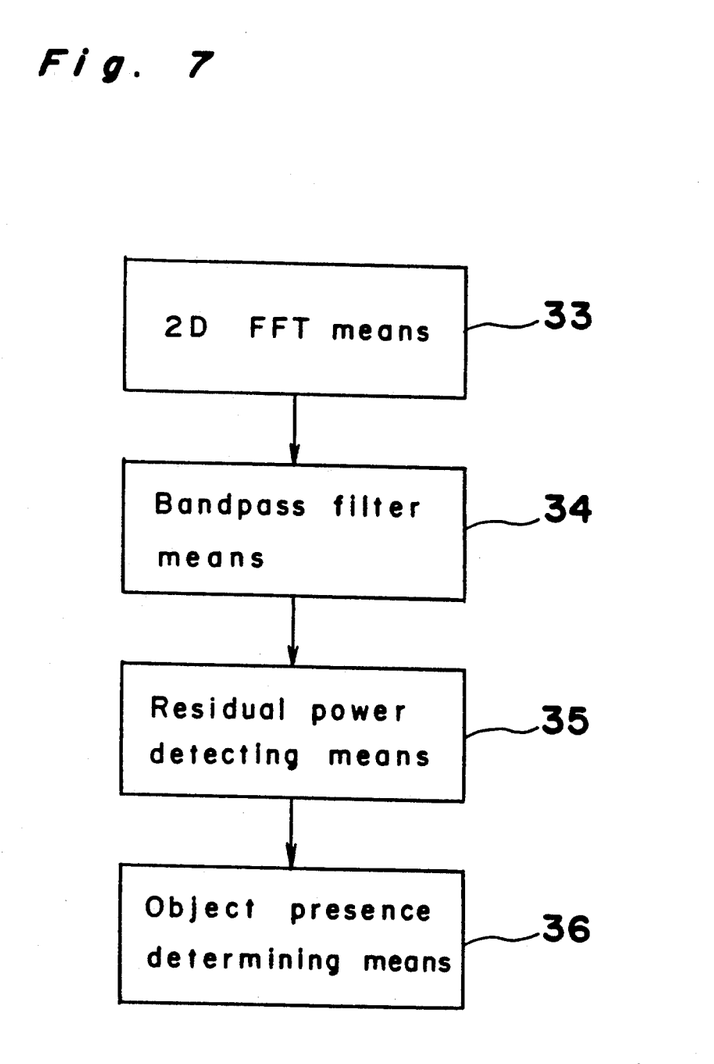
FIG. 7 is block diagram showing a software construction of a recognition apparatus according to a third embodiment of the present invention.
Figure 8:
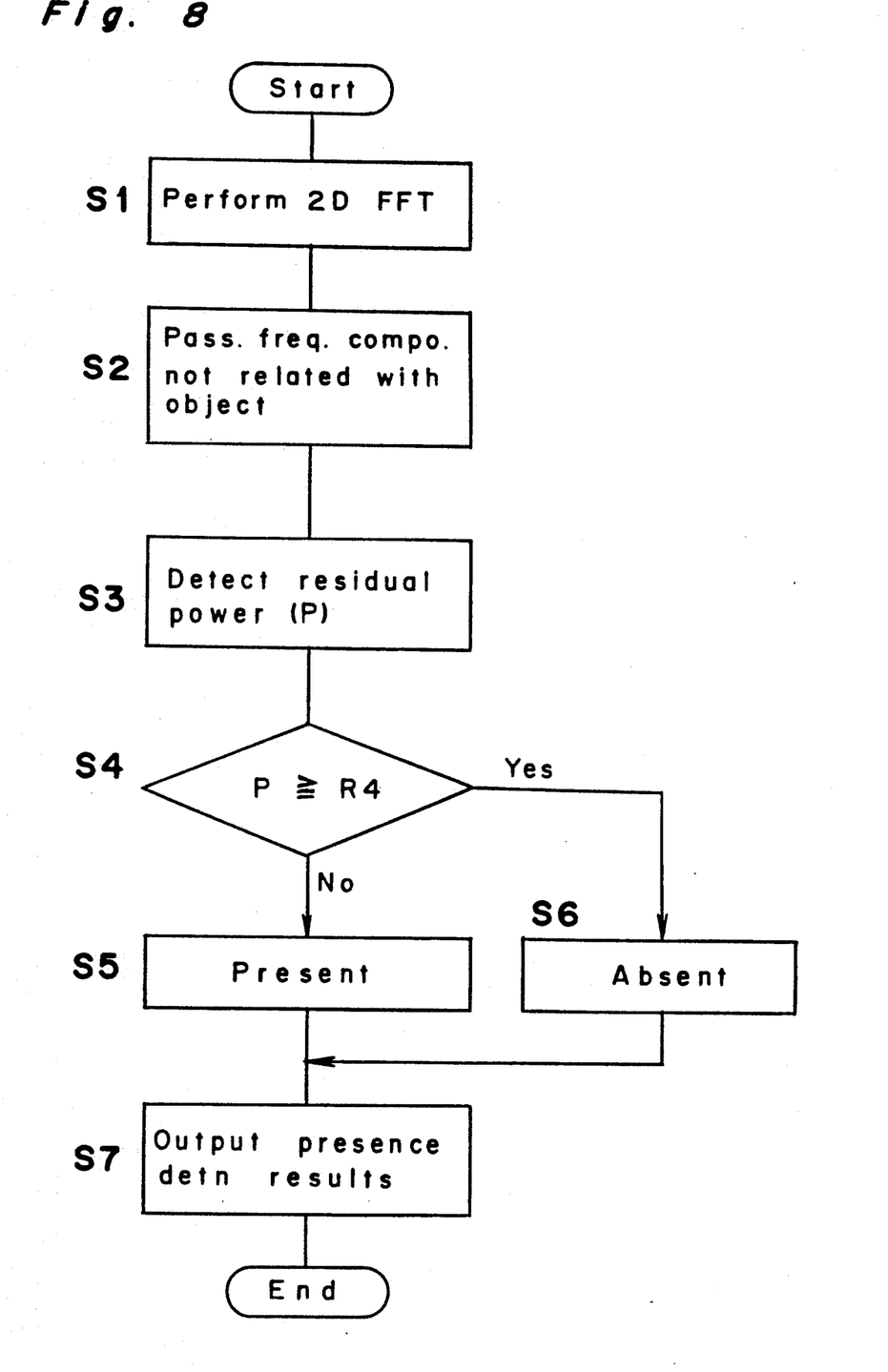
FIG. 8 is a flowchart showing steps taken in the micro computer of the object recognition apparatus of FIG. 7.

FIG. 7 shows a construction of software to be installed in a micro computer C for an object recognition apparatus. The software includes a 2D FFT means 33 for performing a two-dimensional Fast Fourier Transform (2D FFT) process to a set of pixel data contained in each partial area of the mask image (not shown in FIG. 7, see FIG. 2), a bandpass filter means 34 for passing frequency components other than those which appear strongly when an object to be recognized is present in a partial area, a residual power detecting means 35 for detecting residual power after passing through the bandpass filter means 34, and an object presence evaluating means 36 for determining the object presence based on the residual power detected by the residual power detecting means 35.

This embodiment differs from the preceding embodiments basically in that measured data used to determine the presence/absence of the object in a partial area is the power at each frequency, i.e., the power spectrum.

Determination of the object presence/absence in a partial area is performed as follows in accordance with a flowchart of FIG. 8.

The first step is to perform the 2D FFT in a partial area (step S1). This step S1 constitutes the 2D FFT means 33. Then, at step S2, frequency components not related with the object presence are extracted. This step corresponds to the bandpass filter means 34. Then, power P of the extracted frequency components, that is, residual power is detected at step S3. This step S3 forms the residual power detecting means 35.

Next, at step S4, it is discriminated whether the power P is equal to or larger than a reference value R4. As described above, the bandpass filter means 34 pass only frequency components other than those which appear strongly when an object is present in a partial area. Therefore, if the object to be recognized is not present in a partial area, the residual power obtained is high. On the other hand, if the object is present, the residual power is low. Utilizing this, the reference value R4 is given. If P<R4, it is determined at step S5 that the object is present. However, if P≧R4, it is evaluated at step S6 that the object is not present. The presence determination result thus obtained is finally output at step S7. These steps S4-S7 constitute the object presence determining means 36 of FIG. 7.

Because the presence of an object in an partial area is determined by the frequency components characteristic of the shape, texture and so on in the partial area, the object can be discriminated correctly, even though a different object has the same size, and the same bright area.

Fourth Embodiment

Figure 9:
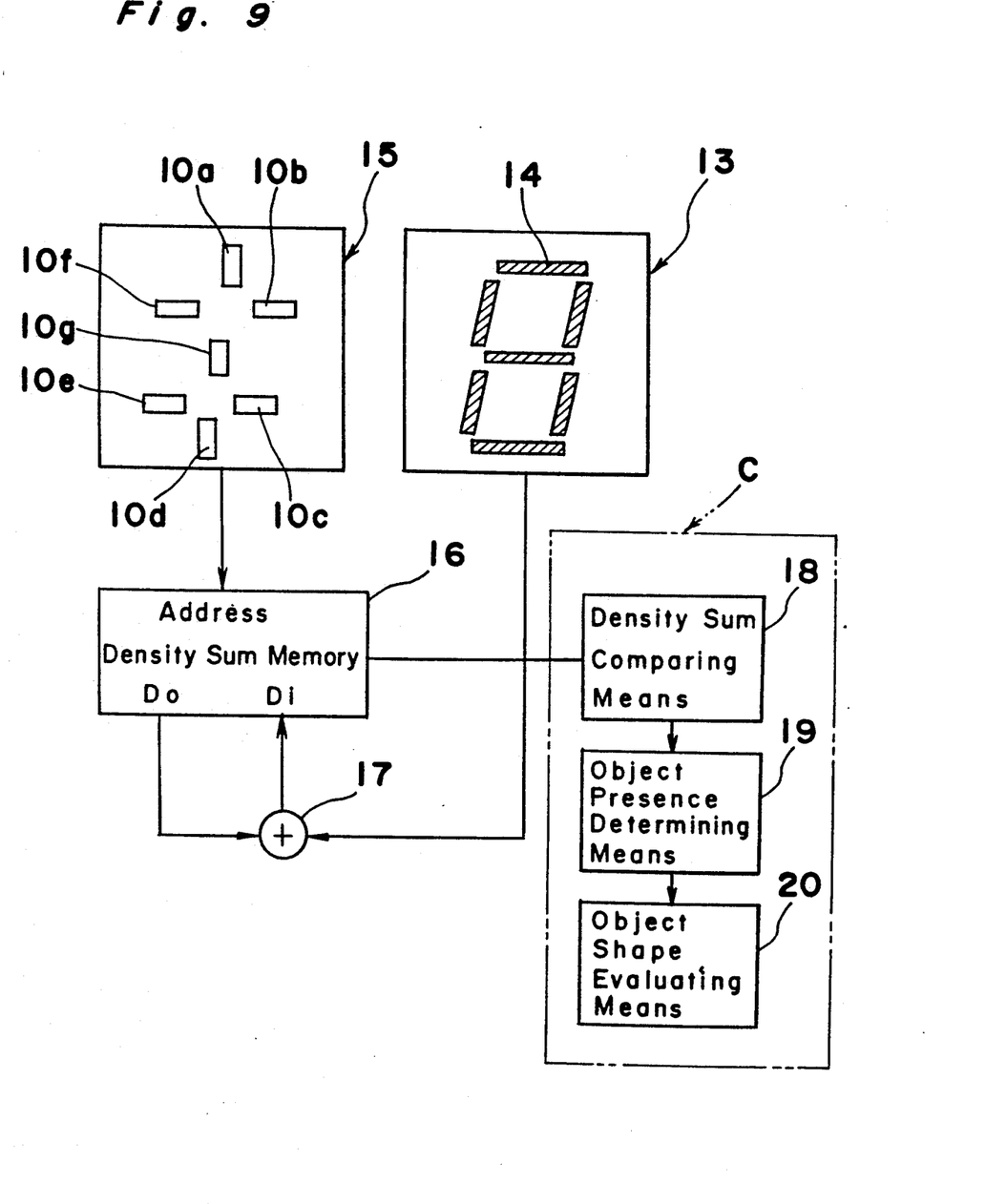
FIG. 9 is a block diagram of an object recognition apparatus according to a fourth embodiment of the present invention.

FIGS. 9 illustrates an object recognition apparatus according to a fourth embodiment of the present invention.

This embodiment is different from the first embodiment basically in that rather than a histogram for each partial area 10a-10g density data of pixels 10 (see FIG. 3) in each partial area 10a-10g is utilized. Like parts in the first and fourth embodiments are indicated by like reference numbers, and further description is omitted below.

In FIG. 9, a reference number 16 indicates a density sum memory which is to store the sum of density data for a partial area, using the output from the mask image 15 as an address, and a reference number 17 indicates an adder-to add data from the image 13 and output from the density sum memory 16 and to output the sum thereof to the Data-in terminal Di of the density sum memory 16. The object recognition apparatus of this embodiment also has a micro computer C which is installed with software constituting a density sum comparing means 18 for comparing the sum of density data for each partial area 10a-10g with a reference value, an object presence determining means 19 for determining the presence of the object 14 based on comparison results obtained by the density sum comparing means 18, and an object shape evaluating means 20 for determining the shape of the object from the combination of partial areas where it is determined that the object 14 is present.

The recognition object image 13 and the mask image 15 are the same size, and processing is executed for all of the pixels 11 in each partial area while sequentially scanning across the complete range. For the pixels 11 in the areas outside the partial areas 10a-10g, the density data of the recognition object image 13 is added to a memory area in the density sum memory 16 for which the address is zero. The density data in the recognition object image 13 corresponding to the first partial area 10a is added to a memory area for which the address is the partial area number. In other words, when sole partial area number is supplied as an address, the density data at that address is output from a data-out terminal Do of the density sum memory 16, density data of a pixel 11 in the partial area is added to the output from the data-out terminal Do by the adder 17, and the addition result is stored again to the same address through a data-in terminal Di. This process is repeated for each pixel in the complete region of the recognition object image 13. As a result of this process, the sum total of density data for each partial area 10a-10g is obtained and stored in each memory area of the density sum memory 16. Prior to this operation, however, the contents of the density sum memory 16 must, of course, be cleared to zero.

Figure 10:
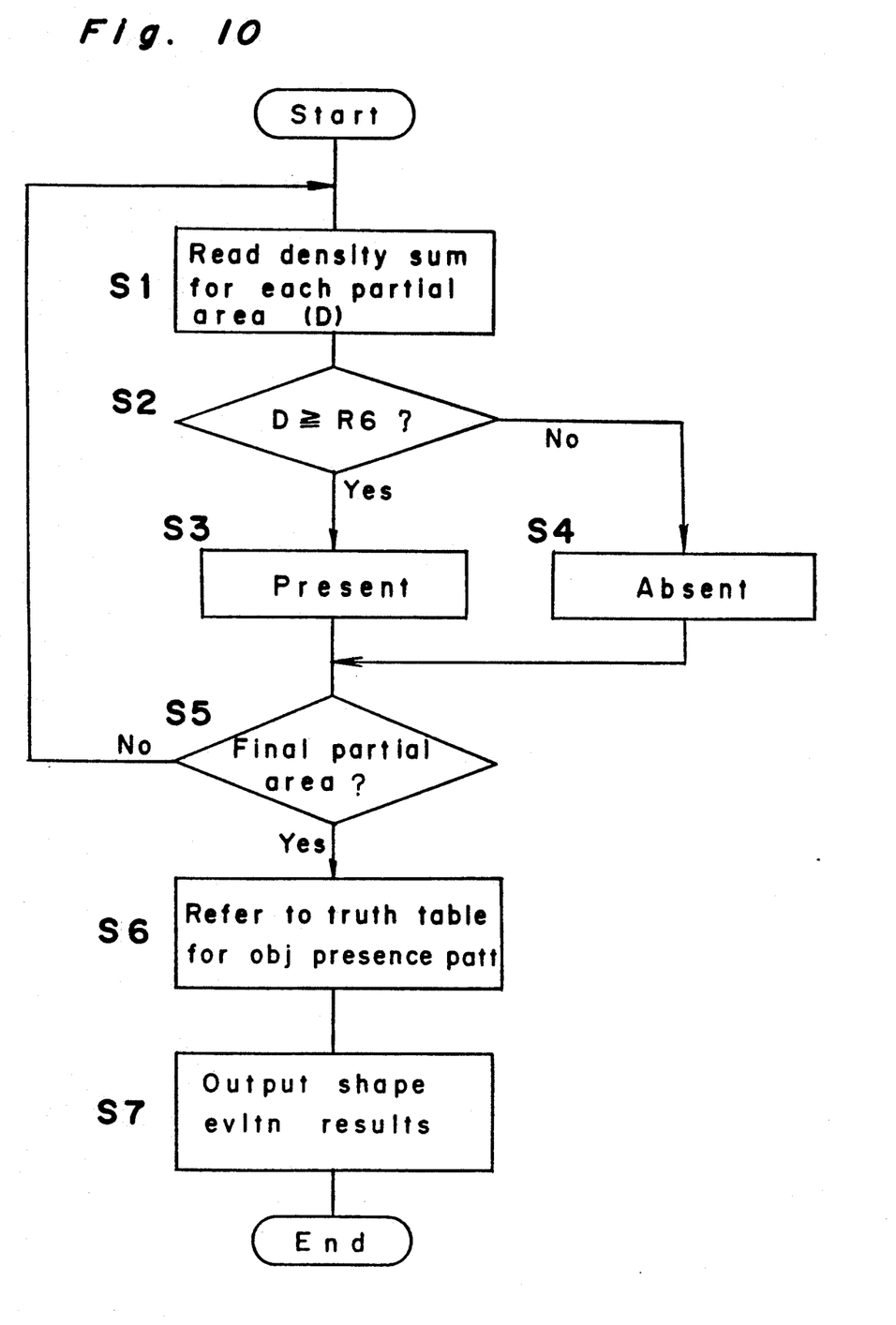
FIG. 10 is a flowchart showing steps taken in the micro computer of the object recognition apparatus of FIG. 9.

The sum of the density data for each partial area is sequentially processed in the micro computer C as follows. The process is shown in FIG. 10.

First, at step S1, the sum total D of density data for the first partial area 10a is read out from the density sum memory 16. Then, at step S2, the density sum D for the partial area 10a is compared with a reference value R6. The reference value R6 indicates a density sum for each partial area 10a-10g when the object 14 is present in each partial area, and is stored in advance in a memory. This step S2 constitutes the density sum comparing means 18.

If the comparison result indicates D>R6, then at step S3, it is determined that the object is present in the partial area 10a. However, if D<R6, it is determined at step S4 that the object is absent therein. These steps S3 and S4 constitute the object presence determining means 19.

At step S5, it is discriminated whether or not the partial area 10a is a final partial area processed. When the partial area 10a is not a final partial area, the above process from step 1 to step 56 is repeated till data processing of the final partial area 10g *l is completed.*

Next, at step S6, the shape of the object 14 is evaluated with reference to a truth table expressing object presence patterns. In this case, it is determined that a "3" is displayed in the 7-segment display from the fact that the object 14 is present in the first through the fourth and the seventh partial areas 10a, 10b, 10c, 10d, and 10g. Finally, the shape evaluation result obtained at step S6 is output at step S7. This step S6 constitutes the object shape evaluating means 20.

As understood from the above, the object recognition apparatus of this embodiment can determine the presence and absence of the object 14 in the partial areas 10a-10g by digitally obtaining the density sum of each of the partial areas 10a-10g without separating the object 14 from the background and obtaining the size of the object 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An object recognition apparatus which processes pixels positioned in a plurality of predetermined partial areas of an image containing an object to be recognized for determination whether the object is present or absent in each of the partial areas, comprising:

first means for preparing a histogram of densities of whole pixels for each partial area while the image is being scanned, wherein the first means includes a histogram memory which has addresses defined by the combinations of numbers indicating the partial areas and all possible densities of the pixels in the partial areas, the histogram memory being initialized before the preparation of the histogram is started so that data at each address represents a value of zero, and when, in each partial area, an actual density is obtained, data at the address determined by the combination of the number representing the partial area and the actual density is read out from the histogram memory and incremented by one and the so incremented data is stored in the histogram memory at the same address;

second means for comparing the histogram obtained by the first means for each partial area with reference data; and third means for determining whether the object is present or absent in each partial area based on a comparison result obtained by the second means.

2. The object recognition apparatus as claimed in claim 1, further comprising means for evaluating the shape of the object from the combination of partial areas where it is determined by the third means that the object is present.

3. The object recognition apparatus as claimed in claim 1, wherein the reference data for each partial area is a reference histogram which indicates that the object occupies at least one part of the corresponding partial area.

4. The object recognition apparatus as claimed in claim 2, wherein the reference data for each partial area is a reference histogram which indicates that the object occupies at least one part of the corresponding partial area.

5. The object recognition apparatus as claimed in claim 3, further comprising means for normalizing the histogram for each partial area and the reference histogram relative to frequency and density.

6. The object recognition apparatus as claimed in claim 4, further comprising means for normalizing the histogram for each partial area and the corresponding reference histogram relative to frequency and density.

7. The object recognition apparatus as claimed in claim 5, further comprising means for accumulating differences in frequency between a normalized histogram for each partial area and the corresponding reference histogram at all densities, wherein the second means compares accumulated differences for each partial area with the corresponding reference value and the third means determines that the object is present in the corresponding partial area when a value representing the accumulated differences is smaller than a further reference value.

8. The object recognition apparatus as claimed in claim 6, further comprising means for accumulating differences in frequency between a normalized histogram for each partial area and the corresponding reference histogram at all densities, wherein the second means compares accumulated differences for each partial area with the corresponding reference value and the third means determines that the object is present in the corresponding partial area when a value representing the accumulated differences is smaller than a further reference value.

9. An object recognition method for processing pixels positioned in a plurality of predetermined partial areas of an image containing an object to be recognized for determination whether the object is present or absent in each of the partial areas, comprising steps of:

preparing a histogram of densities of whole pixels for each partial area while the image is being scanned, wherein a histogram memory which has addresses defined by the combinations of numbers indicating the partial areas and all possible densities of the pixels in the partial areas is used, the histogram memory being initialized before the preparation of the histogram is started so that data at each address represents a value of zero, and when, in each partial area, an actual density is obtained, data at the address determined by the combination of the number representing the partial area and the actual density is read out from the histogram memory to be incremented by one and the so incremented data is stored in the histogram memory at the same address;

comparing the histogram for each partial area with a reference histogram which indicates that the object occupies at least one part of the corresponding partial area; and determining whether the object is present or absent in each partial area based on a comparison result.

10. The object recognition method as claimed in claim 9, further comprising a step for evaluating the shape of the object from the combination of partial areas where it is determined that the object is present.

* * * * *